United States Patent [19]

Ardon

[11] Patent Number: 5,544,235
[45] Date of Patent: Aug. 6, 1996

[54] IDENTIFICATION OF CALLED DIRECTORY NUMBER AT MULTIPLE DIRECTORY NUMBER PER LINE PREMISES PRIOR TO RINGING SIGNAL RECEPTION

[75] Inventor: Menachem T. Ardon, Naperville, Ill.

[73] Assignee: AT&T Corp., Murray Hill, N.J.

[21] Appl. No.: 344,787

[22] Filed: Nov. 23, 1994

Related U.S. Application Data

[63] Continuation of Ser. No. 26,919, Mar. 5, 1993, abandoned.

[51] Int. Cl.$^6$ .......................... H04M 5/20; H04M 13/00
[52] U.S. Cl. ...................... 379/177; 379/164; 379/251; 379/252; 379/373; 379/376
[58] Field of Search .................... 379/142, 164, 379/171, 177, 178, 179, 180, 181, 182, 183, 214, 215, 217, 233, 245, 246, 247, 251, 252, 373, 374, 375, 376, 418, 372

[56] References Cited

U.S. PATENT DOCUMENTS

| | | | |
|---|---|---|---|
| Re. 31,789 | 1/1985 | Hashimoto | 379/142 |
| 3,790,718 | 2/1974 | Jenkins, Jr. | 379/181 |
| 3,928,732 | 12/1975 | Simon et al. | 379/164 |
| 4,293,737 | 10/1981 | Cepalinski | 379/179 |
| 4,582,956 | 4/1986 | Doughty | 379/142 X |
| 4,646,347 | 2/1987 | Liu | 379/164 |
| 4,672,660 | 6/1987 | Curtin | 379/142 |
| 4,720,848 | 1/1988 | Akiyama | 379/88 |
| 4,723,271 | 2/1988 | Grundtisch | 379/179 |
| 4,763,191 | 8/1988 | Gordon et al. | 348/7 |
| 4,776,005 | 10/1988 | Petriccione et al. | 379/142 |
| 4,788,682 | 11/1988 | Vij et al. | 379/96 X |
| 4,942,598 | 7/1990 | Davis | 379/57 |
| 4,985,913 | 1/1991 | Shalom et al. | 379/76 |
| 4,998,273 | 5/1991 | Nichols | 379/373 |
| 5,029,202 | 7/1991 | Doernbach, Jr. et al. | 379/375 |
| 5,040,209 | 8/1991 | Greenberg et al. | 379/373 |
| 5,086,458 | 2/1992 | Bowen | 379/164 |
| 5,097,528 | 3/1992 | Gursahaney et al. | 379/67 |
| 5,200,994 | 4/1993 | Sasano et al. | 379/374 X |
| 5,202,917 | 4/1993 | Wakai | 379/159 |
| 5,214,691 | 5/1993 | Cotton et al. | 379/171 |
| 5,253,289 | 10/1993 | Tanaka | 379/373 |
| 5,263,084 | 11/1993 | Chaput et al. | 379/215 |
| 5,305,312 | 4/1994 | Fornek et al. | 370/62 |
| 5,351,285 | 9/1994 | Katz | 379/94 X |
| 5,425,089 | 6/1995 | Chan et al. | 379/183 |
| 5,442,692 | 8/1995 | Yamazaki et al. | 379/253 |
| 5,479,496 | 12/1995 | Endo et al. | 379/212 |

FOREIGN PATENT DOCUMENTS

| | | | |
|---|---|---|---|
| 0062763 | 3/1991 | Japan | 379/245 |
| 4045643 | 2/1992 | Japan | 379/245 |
| 2258119 | 1/1993 | United Kingdom . | |

OTHER PUBLICATIONS

"Facilities for Users of SOPHO–SET Feature Phones", PTR Philips Telecommunication and Data Systems Review, 48 (1990) March, No. 1, Hilversum, NL, pp. 20–27.

"Digital Answering System Speakerphone 1545"—Owner's Manual 530-501-029-AT&T 1992.

"Calling or Called Number Feature for Telephone System", IBM Technical Disclosure Bulletin, vol. 25, No. 7B, Dec. 1982, R. L. Brady et al. pp. 3961–3962.

*Primary Examiner*—Jeffery Hofsass
*Assistant Examiner*—Scott L. Weaver
*Attorney, Agent, or Firm*—Michael B. Johannesen

[57] ABSTRACT

A telecommunication network having a switching system connected to a called station by a line that provides notification to a called party of information relating to an incoming call. This information generally consists of the called number, but may also include an extension or other code. The called party identification is delivered to the called telephone station set during the silent period after ringing, or, advantageously, before ringing starts. A signal (e.g., FSK) is sent to the called telephone station set shortly before the ringing signal is sent to the called station. A converter at the customer premises receives the FSK signal and demodulates it. A control unit connected to the converter then causes the called DN to be displayed, may cause a distinctive ring to be made, or take other action depending upon its program.

16 Claims, 2 Drawing Sheets

5,544,235

1

IDENTIFICATION OF CALLED DIRECTORY NUMBER AT MULTIPLE DIRECTORY NUMBER PER LINE PREMISES PRIOR TO RINGING SIGNAL RECEPTION

This application is a continuation of application Ser. No. 08/026,919, filed on Mar. 5, 1993, now abandoned.

CROSS-REFERENCE TO RELATED APPLICATION

This application is related to U.S. patent application Ser. No. 08/026,952 entitled "Analog Multibutton Telephone Keysets," filed concurrently with this application.

TECHNICAL FIELD

This invention relates to the field of telephone communications, and, more specifically, to the area of providing terminating-party, called line identification (TCLID).

BACKGROUND OF THE INVENTION

In current telecommunications switching systems, multiple directory numbers (DNs) can be assigned to one line. When a call comes into a terminating switching system, a database is searched at that terminating switch to determine the relationship between the incoming call's DN and the equipment number (EN) of the physical line connected to a telephone. The call is then assigned to that line. Conceptually, any number of DNs can be associated with one line. The usefulness of having multiple DNs associated with one line, however, is limited by the currently available facilities at the customer's premises to identify the called DN prior to answering the call, or, preferably, even prior to applying ringing signals to the customer's equipment.

One example in the prior art of informing customers as to the called DN is distinctive ringing or coded ringing (sometimes called "teen ringing"). In this feature, when multiple DNs are associated with a single line, up to four distinctive ringing cadences can be associated with the different DNs. The customer can, prior to answering the phone, but after at least one ringing cycle, determine which DN was dialed by the cadence of the ring. Implementation of this feature, however, requires special high-level service circuits at the switching system to produce the different cadences or tones, and the associated operational software, which are costly as compared to the number of lines using this service.

A further example of the problem of DN identification at the customer premises is in the area of party lines. A great deal of effort and expense goes into constructing line units and designing software to operate line units so that they can accommodate party lines. Some party lines use distinctive ringing, as described above, so that each party on the party line has a distinctive ring. Other line units have special circuitry to provide each telephone on the party line with a private ringing, or "selective ringing" as it is called in the art, by reversing tip-ring for one phone on the party line, etc., as is known in the art. Additionally, there are schemes that encode the ringing signal with various DC signals to provide private ringing for each party on a party line. Special telephones are required to decode this type of ringing signal. Encoded ringing may also be achieved by differentiating the frequency of the ringing signal. All of these schemes require special line unit circuitry and software.

2

Therefore, a problem in the art is that there is no inexpensive system or method to alert a customer of the terminating directory number for a telephone line associated with a plurality of directory numbers.

SUMMARY OF THE INVENTION

This problem is solved and a technical advance is achieved in the art in a telecommunication network having a switching system connected to a called station by a line that provides notification to a called party of information relating to an incoming call. This information generally consists of the called number, but may also include an extension number or other identification code. This invention comprises a system and method for delivering called party identification to the called telephone station set during the silent period after ringing, or, advantageously, before ringing starts. A signal representative of the called number (e.g., FSK) is sent to the called telephone station set shortly before the ringing signal is sent to the called station. A converter at the customer premises receives the FSK signal and demodulates it. A control unit connected to the converter then causes the called DN to be displayed, or a distinctive ring to be made, or other action taken depending upon its program. An illustrative embodiment may utilize the converter output to cause selective connections to different terminal units, such as a telephone, a modem or a facsimile machine.

BRIEF DESCRIPTION OF THE DRAWING

A more complete understanding of the invention may be obtained from consideration of the following description in conjunction with the drawings in which.

DETAILED DESCRIPTION

Figure 1:
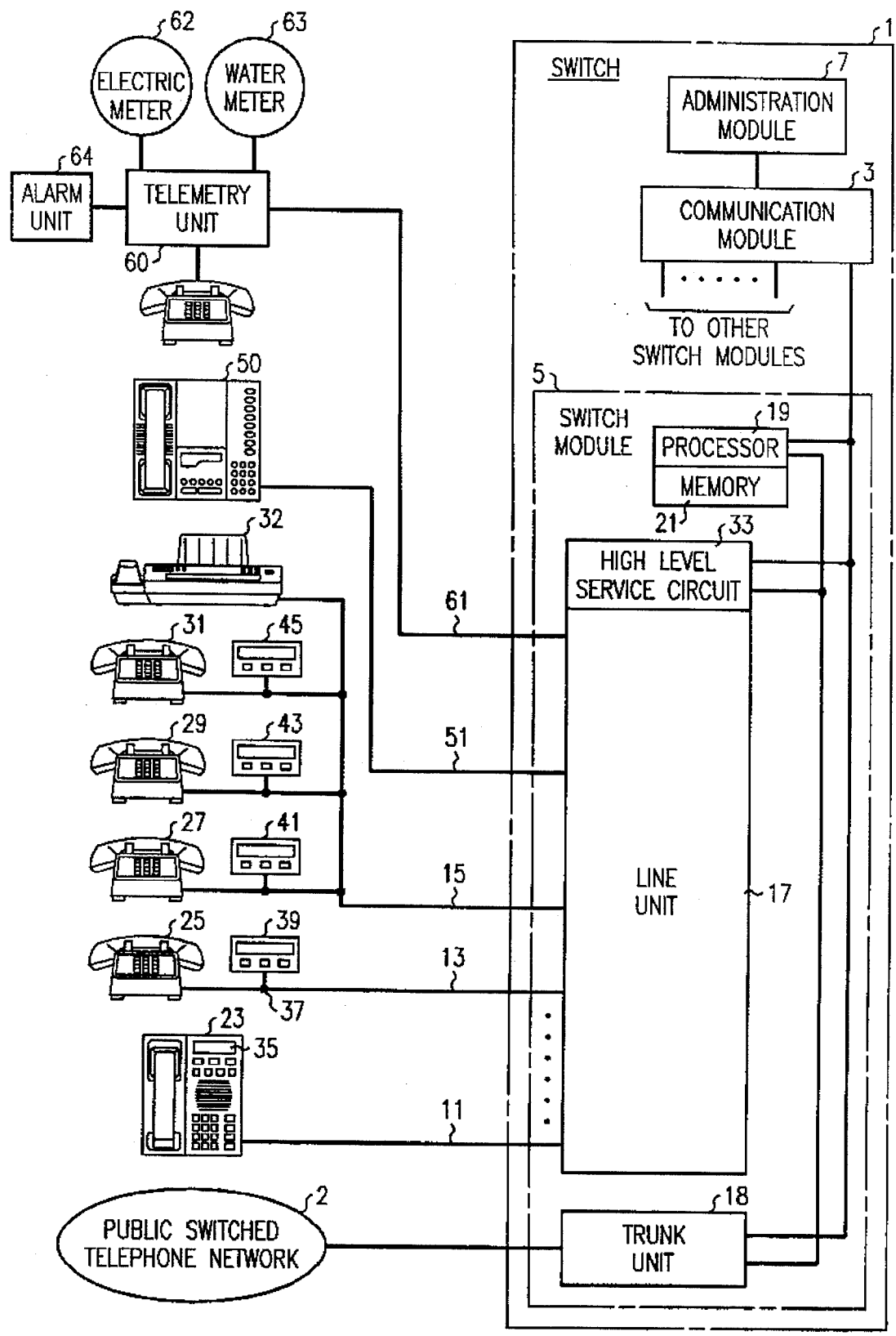
FIG. 1 is a block diagram of a telephone switching system showing a line unit supporting individual lines and party lines according to an exemplary embodiment of this invention.

An exemplary embodiment of a system that identifies the terminating called line identification (TCLID) at the customer premises when multiple directory numbers are assigned to one line is described here in context of a telephone switching system, as illustrated in FIG. 1, having a central office switch 1 which is connected to the public switched telephone network 2. Switch 1 is, illustratively, a distributed control, digital switch such as a 5ESS® switch manufactured by AT&T and described in the AT&T Technical Journal, Vol. 64, No. 6, July/August, 1985, pages 1303–1564. Alternatively, switch 1 may be an analog electronic switching system such as a 1ESS® or 1AESS® switch manufactured by AT&T, or a PBX, without departing from the scope of this invention.

The architecture of switch 1 includes communications module 3 as a hub, with switching module 5 and other switching modules (not shown for clarity) and administrative module 7 emanating therefrom. Switching module 5 terminates analog and/or digital subscriber lines, such as analog line 11, 13, and 15 through line units, such as analog line unit 17. Switching module 5 also terminates analog or digital trunks through trunk units, such as 18, which connects switch 1 to public switched telephone network 2.

Administrative module 7 provides coordination of the functional components of switch 1 and provides a human/machine interface. Switching module 5 also includes processor 19 and memory 21. Processor 19 controls the functionality of switch module 5, and uses memory 21 to store the programs and data by which it operates.

Line unit 17 provides the interface between telephones such as telephones 23–31, facsimile machine 32, and telemetry unit 60, and the switching fabric (not shown) of switch module (SM) 5 in switch 1, as is known in the art. Line unit 17 provides concentration, scanning, and other services, as is known in the art, and will, therefore, not be described further. Line unit 17 also provides a high level service circuit (HLSC) 33 for applying ringing (in this environment) and other services.

An exemplary embodiment of this invention is illustrated in the interaction between line unit 17 and telephone 23 connected by line 11. Telephone 23 has, for example, two DNs associated with it. Telephone 23 includes display 35 which can display alphanumeric characters, as known in the art. According to this invention, a call is set up to telephone 23 from switch module 5 through line unit 17. As part of the call set up, processor 19 receives one of the directory numbers (DN) for telephone 23. Processor 19 performs a database search in memory 21 to translate the incoming directory number into a line identification or equipment number (EN), so that processor 19 may cause line unit 17 to connect line 11 to the incoming call. Processor 19 then determines that line 11 is not busy and causes HLSC 33 (or, alternatively, another service unit, such as a low current digital service unit within SM 5) to generate a frequency shift keyed (FSK) signal to encode the incoming DN into an analog signal that can be sent across line 11. Before processor 19 applies ringing to line 11, it causes the FSK signal to be sent to telephone 23 on line 11. Then processor 19 may optionally apply ringing through HLSC 33 in line unit 17.

A converter at telephone 23, as will be described further in connection with FIG. 2, receives the FSK signal and demodulates it. A control unit in telephone 23 then causes the demodulated TCLID to be displayed on display 35. Further, the control unit in telephone 23 could cause an audible signal, such as a distinctive ring, to occur, depending on which directory number was being called, or take other action, depending on its program. Thus, the user or customer of telephone 23 can determine which DN is being called during or prior to the first ringing cycle, and answer the call accordingly.

An embodiment showing this invention in its most basic form may be seen in analog telephone 25 connected to line unit 17 by line 13. "Tee" connection 37 on line 13 provides an interface for converter box 39, which will be described further in connection with FIG. 2. Converter box 39 is known in the art as an incoming call line ID (ICLID) box and is commercially available. An ICLID box receives an FSK encoded message and displays it. The controller in display box 39 receives the FSK signal, causes the converter to convert the FSK signal into digits, and displays the digits on the display window. Ringing is then sent to telephone 25 by switch 1. The TCLID signal may be sent before ringing and the ICLID signal may then be sent during the silent periods between the ringing signal. The ICLID box may alternately display the two DNs or display them in different areas of the display. Thus, the called DN is displayed before ringing is applied.

Many new features may be implemented using the delivered TCLID without having to have expensive equipment in switch 1 or line unit 17. For example, a feature such as "teen ringing," wherein telephone 23 rings differently depending on the DN dialed, can be implemented. Instead of using HLSC special resources, as required in the prior art, telephone 23 includes a converter connected to line 11, a processor connected to the converter, and an audio device (all of which are described in FIG. 2) connected to the processor. The converter receives the DN and converts it to digits. The processor compares the digits to a list pre-stored in memory, and causes the audio device to signal differently, depending on the incoming DN. Optionally, the processor may also display the TCLID, as described above. Thus, the customer is audibly and/or visually alerted, as to which line is ringing without requiring costly central office equipment.

Additionally, an enhanced call waiting service may be implemented according to this invention. In this exemplary embodiment, telephone 23 or 25 has two (or more) DNs assigned to it. If, for example, a customer is talking on telephone 23, and a call waiting signal is heard, the customer needs to know which DN has a call waiting in order to make an informed choice whether to answer. In current telephone practice, the voice path is temporarily interrupted when the call waiting signal is given. The FSK signal can, therefore, be sent to the receiving party just after the voice path is interrupted, but prior to the call waiting audio signal. By this invention, the FSK signal is sent to telephone 23 and displayed on 35 just before the call waiting signal is sent. Since display 35 shows the TCLID, the customer has more information before choosing to answer the waiting call.

Another service that can be enhanced by using this invention is forwarding a call through hunt groups. The customers of telephone 23 and telephone 25 belong to a hunt group, for purposes of describing this service. When a call is connected to line 13 of telephone 25, an FSK signal (indicating the DN of telephone 23) is sent and decoded by display 39. In this manner, the customer of telephone 25 can determine to whom the call was originally directed, prior to the first ring and answer the telephone accordingly.

A further exemplary embodiment of this invention may be seen in line 15, which is connected to telephones 27, 29, and 31, and facsimile machine 32. This example of this invention applies equally to a home or business with multiple extensions, as illustrated, or to a party line. In this embodiment, there are four directory numbers assigned to line 15. There may be, for example, one DN associated with a home business, one DN as a family number, one DN for the facsimile machine, and a fourth for teenagers in the household. Each telephone has a display box 41, 43, and 45 associated with it which can receive and convert FSK signals and demodulate them, as described above. When a call is received for the family DN, for example, the call is set up as before and the FSK signal is sent over line 15. All display boxes 41, 43, and 45 demodulate the signal and display it. The person answering any of the phones 27–31 can then determine which DN is being called during the first ringing cycle.

Additionally, facsimile machine 32 has a separate DN associated with it, as stated above. Facsimile machine 32 includes a processor and converter, as described below in connection with FIG. 2. When a call comes in for the DN associated with facsimile machine 32, the FSK signal is generated and sent on line 15, as described above. Responsive to preprogramming, the converter at facsimile machine 32 receives the FSK signal, decodes the TCLID, and determines that the DN is for itself. Facsimile machine 32 immediately sends an off-hook signal responsive to the ringing signal. Therefore, facsimile machines such as facsimile machine 32 and other terminal units, such as auto-answer modems and other non-voice terminals share a line with telephones or other terminals.

Further new features can be implemented using various combinations of the telephones of FIG. 1. The telephones on line 15 may implement an intercom by dialing a special code and hanging up. Processor 19 recognizes the special code, sends an FSK signal on line 15 corresponding to the code, and applies ringing to line 15. The called party knows to pick up the call because of the displayed code, and the calling party can then pick up the phone as well. Battery feed for this arrangement is supplied by line unit 17, as known in the art, for revertive ringing of party lines.

Each telephone 27–31 may have one DN and special extension numbers associated with each telephone. If the calling party invokes a feature code (i.e., #7), recognized by the switch, dials the DN, and one of the extension numbers, only the telephone corresponding to the extension number may ring. In this manner, only the telephone in the teen's room rings for certain calls, but all the telephones 25–31 ring when no extension is included with the FSK signal.

Centrex-like features can be enhanced using this invention. For example, an enhanced analog-shared DN could be implemented by sending the FSK signal to a plurality of lines, such as lines 11, 13, and 15, prior to applying ringing. Each member of the group could then determine whether to pick up the call or not, by invoking a call pickup, call pickup with barge in or other feature as known in the art. Additionally, special telephones could be used that light one or more lines responsive to a particular DN.

This invention is also applicable to an answering machine, such as answering machine 50. Answering machine 50, in the preferred embodiment, comprises a digital answering system similar to an AT&T 1545. In the AT&T 1545, a plurality of different messages may be digitally recorded in electronic memory in up to four mail boxes. The mail boxes are selected by the calling party entering dual-tone, multifrequency digits responsive to a prompt message delivered by the answering system. According to an exemplary embodiment of this invention, an FSK signal carrying the terminating party identification (TCLID) is sent on line 51. Answering system 50 receives the TCLID and, if no one answers the telephone, causes a prompt message to be played. Advantageously, a prompt message is selected from a plurality of prompt messages (one per DN assigned to line 51) responsive to the TCLID. Messages are then stored (and retrieved) in a mail box corresponding to the TCLID, without any input required from the calling party.

A telephone-base telemetry system may also be implemented in a further embodiment of this invention. A telemetry unit 60 is installed on a telephone line 61 in a home. When a utility company wants to read an electric meter 62 or water meter 63 in the home, it dials, a special feature code, the DN of the home telephone, and appends a special number. Advantageously, the special number may be a code known only to the utility. Alternatively, a special trunk may be connected between the switch and the utility which provides greater security for the utility connection. A data base can then drive connection to line 61, which the switch connects to the utility's trunk. Switch 1 then sends an FSK signal encoded to include at least the special number. Telemetry unit 60, responsive to the special number, reads electric meter 62 or water meter 63 and sends the data to the utility.

A further telemetry unit facility connects to a home security system, such as alarm unit 64, connected to telemetry unit 60. Periodically, the alarm company can test the functionality of alarm unit 64 by sending a code, as above. Telemetry unit 60 queries alarm unit 64, and responds to the alarm company.

Telemetry unit 60, or any other TCLID device, may provide a loop-back function so that the local telephone company may test the line. The telephone company sends a special code, as before, and telemetry unit 60 responds by putting the system into loop-back mode. Another code may be sent on line 61 to restore service.

A service that can use this invention is incoming wide area telephone service, also known as "800", or "900" service. Several businesses may have individual "800" numbers, but all share a single line to an operator. When a call comes in to the operator, the terminating switch sends an FSK signal carrying the encoded terminating DN. A converter at the operator station converts the FSK signal into digits, which are displayed to the operator. The operator can then answer the call appropriately for each business. This feature can also be used with hunted multiple operator positions.

Figure 2:
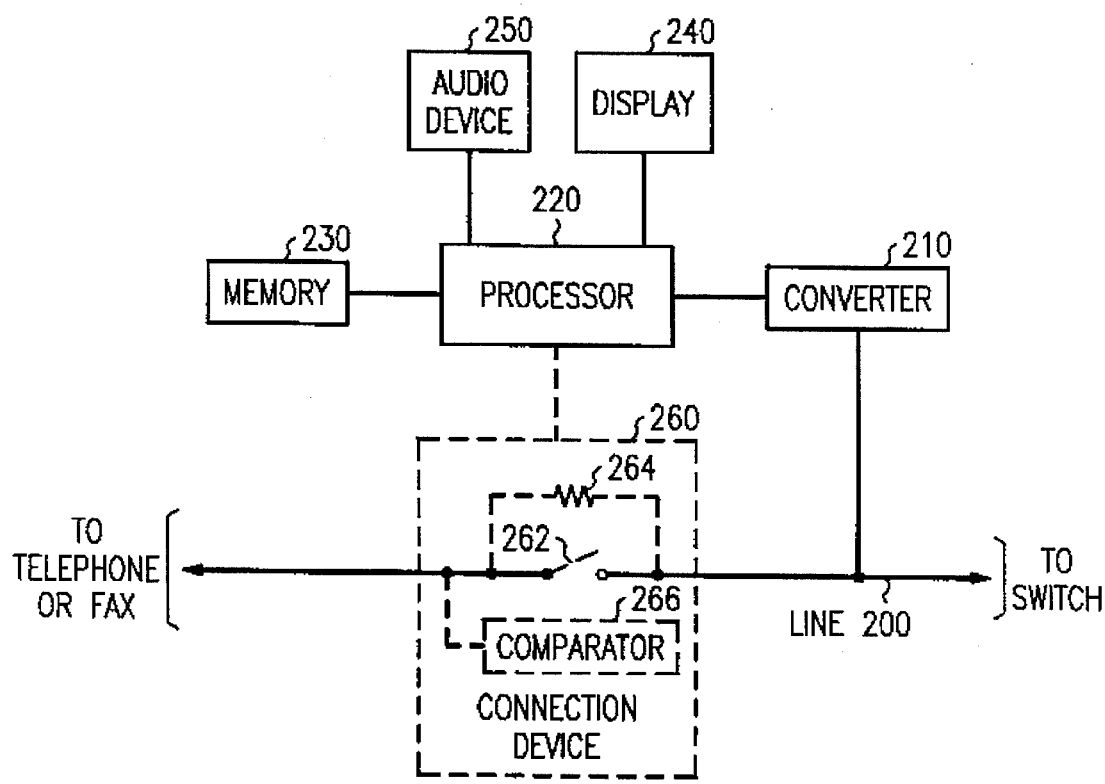
FIG. 2 is a functional block diagram of a converter device for use at a telephone or facsimile machine according to an exemplary embodiment of this invention.

Turning now to FIG. 2, a functional block diagram of a converter device for use at telephone 23, converter 39, facsimile machine 32, answering machine 50, or telemetry unit 60 (FIG. 1) is shown. Line 200 is connected between switch 1, FIG. 1, and one or more of telephones 23–31 or facsimile machine 32, in FIG. 1. Converter 210 is connected to line 200 and converts FSK signals into computer-understandable digits, as is known in the art. Processor 220 is connected to converter 210 and receives from converter 210 the converted digits. Processor 220 is under control of programs stored in memory 230. Processor 220, as one of its functions, can display digits from converter 210 on display 240. Processor 220 also controls audio device 250. Processor 220 can perform database look-ups in memory 230, which could contain a listing of all or selected DNs and assorted information, such as name, location, or other code. Processor 220 can also control audio device 250 by causing different signaling or ringing to occur for each different directory number programmed into memory 230.

Additionally, processor 220 may control a connection device 260 (shown in phantom), which can cause a connection to occur on line 200 when processor 220 detects a specific TCLID. Connection device 260 can be used, for example, to connect facsimile machine 32 (FIG. 1) to line 200 before ringing is applied to line 200.

Connection device 260 may be manually operable in order to place outgoing calls. Relay 262, which is biased open, of connection device 260 is bridged by a high value resistor 264. A comparator 266,, as known in the art, detects an offhook at the telephone or facsimile connected to device 260 because the voltage on line 200 will drop from approximately 48 volts to approximately 0. Relay 262 can then be closed to permit the outgoing call. Thus, the facsimile machine only answers calls for its own DN, but can call out at any time.

The device of FIG. 2 may be entirely within facsimile 32 or may be a separate box connected to the line between the facsimile and the switch. Alternatively, the device of FIG. 2 may be incorporated into a telephone, such as telephone 23, of FIG. 1, or maybe a separate box, such as converter box 39 of FIG. 1. The device of FIG. 2 may also be used to connect an answering machine or other voice mail system to the line.

It is to be understood that the above-described embodiments are merely illustrative principles of the invention and that many variations may be devised by those skilled in the art without departing from the scope of the invention. For example, in all cases where the TCLID signal is described above as displaying a DN, an alternative display of a corresponding nature, such as a person's name or other code could be produced. It is, therefore, intended that such variations be included within the scope of the claims.

I claim:

1. In a telecommunications network having a switching system directly connected to a called station at a customer premises by one line, wherein said called station includes an audible signaling device, said customer premises also having a converter connected to said one line, wherein multiple directory numbers are assigned to said one line at said switching system, a method for identifying at said customer premises which one of said multiple directory numbers is being called, said method comprising the steps of:

receiving, in said switching system, signals from a calling station identifying one of said multiple directory numbers assigned to said one line of said called station;

said switching system delivering data on said one line identifying said one of said multiple directory numbers being called;

said converter converting said data into an identification of said one of said multiple directory numbers being called at said customer premises by generating in the called station an audible signal different for each of said multiple directory numbers depending upon said one of said multiple directory numbers being called; and said switching system subsequently delivering a ringing signal to said called station on said one line, said ringing signal being the same for all of said multiple directory numbers assigned to said one line.

2. The method of claim 1 wherein said one line is analog, said method further including the step of said switching system generating a frequency shift key encoding of said one of said multiple directory numbers being called, said step of delivering data identifying said one of said multiple directory numbers being called comprises transmitting said frequency shift key encoded directory number.

3. The method of claim 1 wherein said converter includes a display in said called station and wherein said step of converting said data into an identification of the called one of said multiple directory numbers further includes displaying the one of said multiple directory numbers being called on said display on said called station.

4. A terminating arrangement having a single line connecting a plurality of terminal units to a switching system, each of said terminal units having a unique directory number, said switching system being responsive to an incoming call comprising a called directory number of one of said plurality of terminal units for setting up a call to said one line and sending signals to said terminal units representative of said called directory number as a terminating called line identification (TCLID) prior to sending a ringing signal on said one line, each of said terminal units comprising:

converter means responsive to said signals representative of said called directory number for converting said TCLID into digits;

processor means connected to said converter means for comparing said digits with the terminal unit's unique directory number; and connection means, responsive to said processor determining that said digits correspond to said unique directory number, for connecting said terminal unit to said line to receive said call prior to receipt of said ringing signal.

5. The terminating arrangement of claim 4 wherein one or more of said terminal units comprise a telephone.

6. The terminating arrangement of claim 4 herein one or more of said terminal units comprise a non-voice terminal system.

7. The terminating arrangement of claim 6 wherein said non-voice terminal system comprises a facsimile machine.

8. The terminating arrangement of claim 6 wherein said non-voice terminal system comprises a modem.

9. A connection device for connecting a terminal unit to a switching system, said terminal unit connected to said connection device, and said connection device connected to said switching system by a single line having a plurality of directory numbers assigned thereto, said terminal unit having been assigned one of said plurality of directory numbers, said switching system being responsive to an incoming call comprising said one of said plurality of directory numbers for connecting said incoming call to said line and sending signals representative of said one directory number as a terminating called line identification (TCLID) to said line prior to sending a ringing signal on said line, said connection device comprising:

converter means connected to said line responsive to said signals representative of said one directory number for converting said TCLID into digits;

processor means connected to said converter means for comparing said digits with said one directory number of said terminal unit; and connection means responsive to said processor determining that said digits correspond to said one directory number for connecting said terminal unit to said incoming call, said connection means being unresponsive to a deformation of any other directory number.

10. The connection device of claim 9 wherein said terminal unit comprises a facsimile machine.

11. The connection device of claim 9 wherein said terminal unit comprises an answering machine.

12. The connection device of claim 9 wherein said terminal unit comprises a telephone.

13. The connection device of claim 9 wherein said terminal unit comprises a modem.

14. In a telephone network comprising a plurality of interconnected switching systems, a method for alerting one of a plurality of telephones on a party line connected to one of said plurality of switching systems, wherein each of said plurality of telephones has a unique directory number, said method comprising the steps of:

receiving, in said switching system, signals from a calling station identifying the unique directory number of one of said plurality of telephones; and responsive to receipt of said signals, said switching system setting up a call to said party line and transmitting data relating to said unique directory number for display at each of said plurality of telephones prior to sending a ringing signal on said party line.

15. The method of claim 14 wherein said party line is analog, said method further including the step of generating a frequency shift key encoding of said unique directory number, and said step of transmitting data comprises transmitting said frequency shift key encoded directory number.

16. The method of claim 14 wherein each of said plurality of telephones includes an audible signaling device responsive to a elected one of said plurality of directory numbers, said method further comprising the step of each of said audible signaling device audibly signaling for only one of said directory numbers.

* * * * *